(12) United States Patent
Ueyama (10) Patent No.: US 7,193,678 B2
(45) Date of Patent: Mar. 20, 2007

(54) LIQUID CRYSTAL DISPLAY DEVICE AND METHOD FOR MANUFACTURING THE SAME

(75) Inventor: Hiroshi Ueyama, Kagoshima (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 228 days.

(21) Appl. No.: 10/948,758

(22) Filed: Sep. 24, 2004

(65) Prior Publication Data
US 2005/0099574 A1    May 12, 2005

(30) Foreign Application Priority Data
Oct. 24, 2003   (JP) ............................ 2003-364836

(51) Int. Cl.
*G02F 1/1339*   (2006.01)
(52) U.S. Cl. ...................................... 349/153; 349/190
(58) Field of Classification Search ................ 349/153, 349/187, 189, 190
See application file for complete search history.

(56) References Cited

U.S. PATENT DOCUMENTS
6,831,725 B2 * 12/2004 Niiya ......................... 349/153
7,022,199 B2 *  4/2006 Lee et al. ................... 156/106

FOREIGN PATENT DOCUMENTS
JP            5-119325        5/1993

* cited by examiner

*Primary Examiner*—David Nelms
*Assistant Examiner*—David Y. Chung
(74) *Attorney, Agent, or Firm*—McGinn IP Law Group, PLLC (57) ABSTRACT

A liquid crystal display device includes an array substrate having a plurality of first seal frames each forming a panel area to become a display portion and a second seal frame containing these seal frames thereinside and being of a completely closed shape as a whole outside these first seal frames. The liquid crystal display device of the invention has a structure in which the whole inside of the second seal frame including the insides of the first seal frames of the array substrate is filled with liquid crystal by a liquid crystal dripping method and thereafter the color filter substrate is stuck on the array substrate. This display makes it possible to manufacture a liquid crystal display device of an aggregate liquid crystal display panel structure improved in uniformity of gap between both substrates.

16 Claims, 7 Drawing Sheets

LIQUID CRYSTAL DISPLAY DEVICE AND METHOD FOR MANUFACTURING THE SAME

BACKGROUND OF THE INVENTION

1. Field of the Invention

The present invention relates to a liquid crystal display device and a method for manufacturing the same, and more particularly to a liquid crystal display device in which the structure of an array substrate and a liquid crystal dripping area are improved and a method for manufacturing the same.

2. Description of the Prior Art

In a conventional method for manufacturing liquid crystal display panels, liquid crystal is interposed between an array substrate and a color filter substrate (hereinafter, referred to as a CF substrate), both of the substrates are stuck together to make a panel, and then the panel is cut and separated into individual display panels. As a method for interposing liquid crystal between both substrates at this case, there are a method of injecting and filling liquid crystal into a panel area to become a display portion of an array substrate and a method of dripping and filling the liquid crystal into such a panel area. Japanese Patent Laid-Open Publication No. Hei 5-119,325 has disclosed a method of filling liquid crystal using double seals of an outer seal and an inner seal by a liquid crystal injection method. In case of using such a liquid crystal injection method, however, a liquid crystal injection inlet for having liquid crystal injected through it must be provided in a seal and this injection inlet comes to hinder the vacuum at the time of sticking the substrates together.

Therefore, in a recent production process of liquid crystal display devices, a liquid crystal filling method by means of a liquid crystal dripping method is used in general.

A liquid crystal filling method by a liquid crystal dripping method is described in the following.

Figure 1:
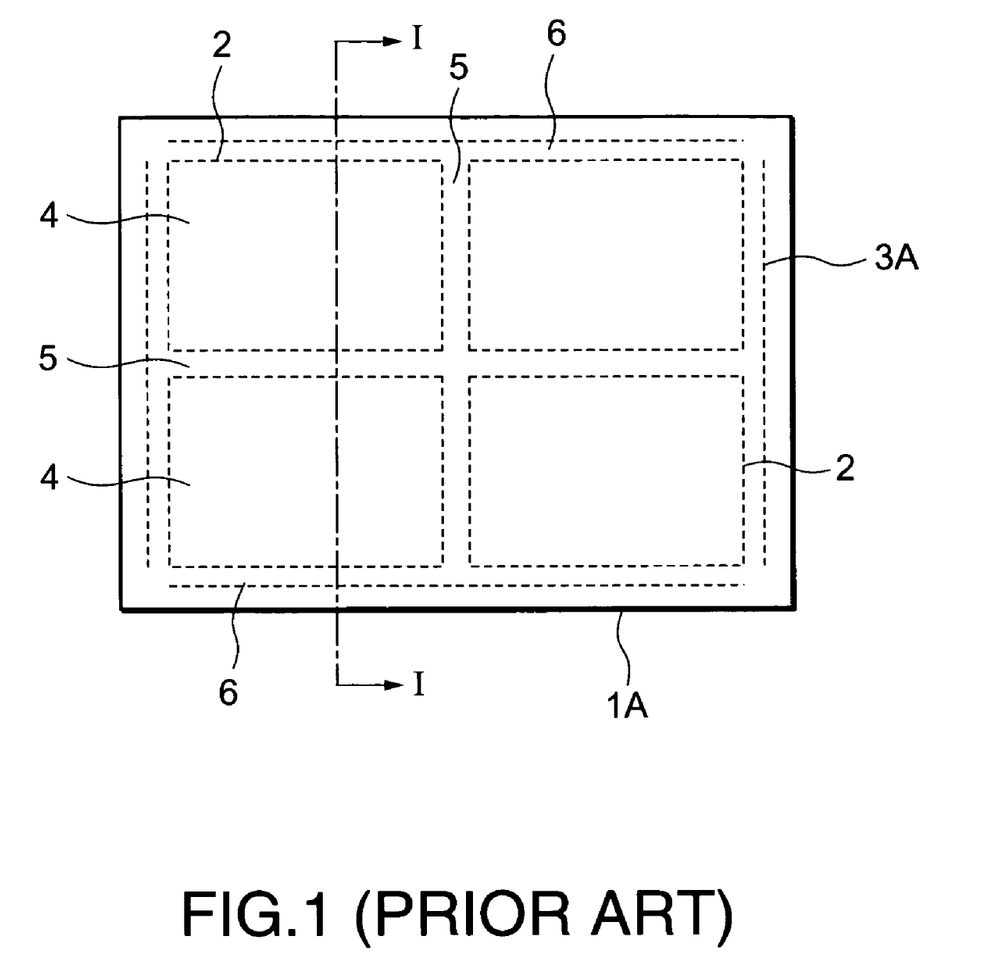
FIG. 1 is a plan view of an array substrate to be used in a conventional liquid crystal display device.

FIG. 1 is a plan view of an array substrate to be used in a conventional liquid crystal display device. As shown in FIG. 1, an array substrate 1A to be used in a conventional liquid crystal display device comprises first seal frames 2 for forming panel areas 4 to become panel display portions by having liquid crystal dripped on them. A large single second seal frame 3A is provided outside the first seal frames 2 so as to contain four first seal frames 2 inside it. Each of these seal frames 2, 3A functions as an adhesive agent for sticking the array substrate and a color filter substrate (not shown) on each other. The inner area of a first seal frame 2 is an area to have liquid crystal dripped on it. The second seal frame 3A is provided in an outer area of the display portions of the array substrate 1A. The four corners of the second seal frame 3A are cut out in order to smooth the flow of air at the time of breaking a vacuum.

A seal inner passage is formed between the first seal frames 2 of the array substrate 1A. A seal outer peripheral passage 6 is formed between the first seal frames 2 and the second seal frame 3A. Detailed description of a CF substrate is omitted.

Figure 2:
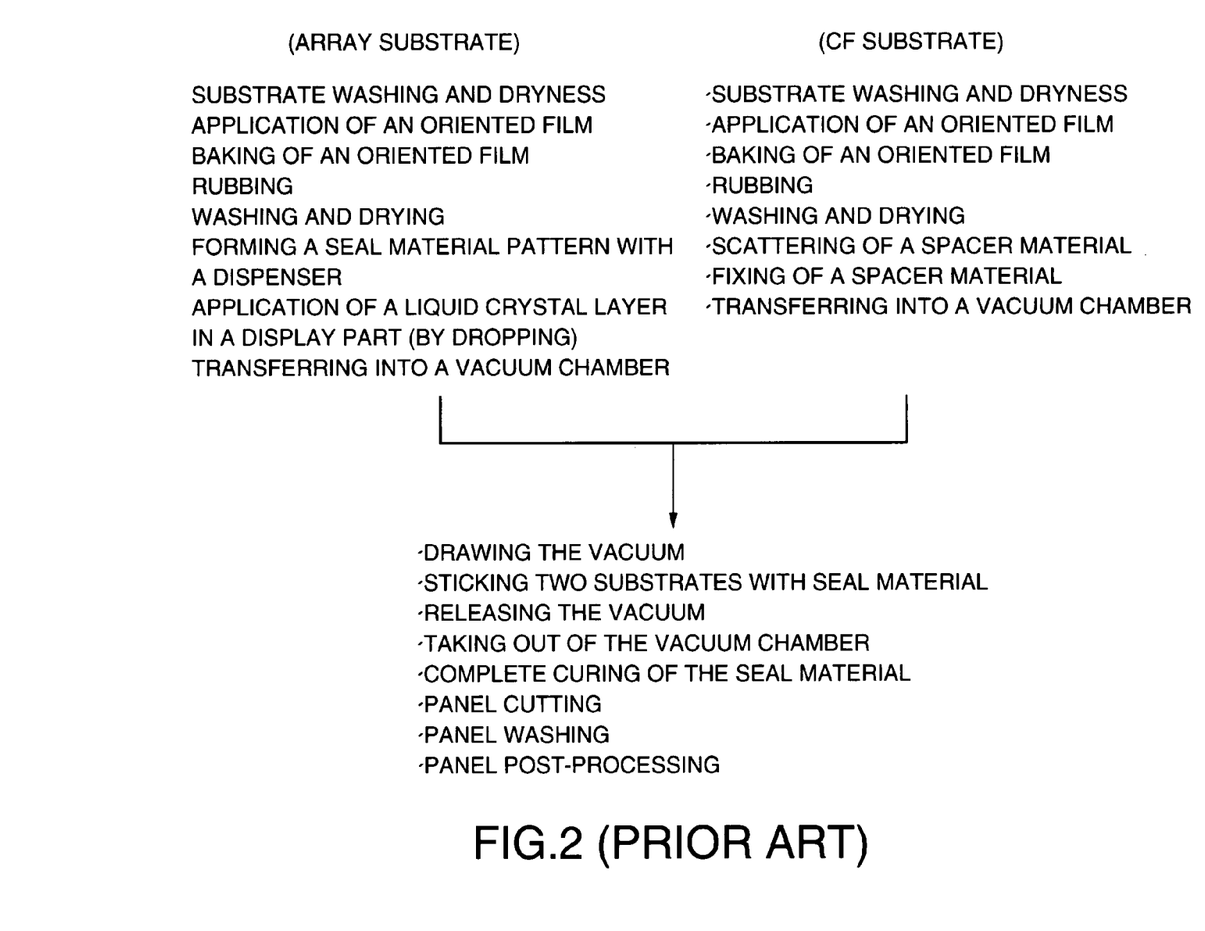
FIG. 2 is a production flow chart of a liquid crystal display device for explaining a conventional example.

FIG. 2 is a figure for explaining an example of the production flow of a conventional liquid crystal display device. As shown in FIG. 2, the upper left half of the figure is the production flow of an array substrate 1A and the upper right half of it is the production flow of a CF substrate.

First, both of an array substrate and a CF substrate are washed and dried. Then, an oriented film (orientation material) is applied or printed onto the surface of each of the substrates. And both the substrates are dried to evaporate a solvent contained in the orientation material. After this, rubbing is performed on both the substrates to give an orientation to the applied orientation material. Subsequently, both the substrates are washed and dried.

Next, a seal material is applied to the array substrate and a patterning process is performed on it. In this patterning process, first seal frames 2 for sealing the periphery of a panel display portion in the shape of a closed loop is first formed. Further, a second seal frame 3A having its four corners cut out is formed so as to contain the first seal frames 2. As a method of forming these seals, a drawing method using a seal dispenser device is used. On the other hand, a spacer material is scattered on the CF substrate.

The liquid crystal injection method and the liquid crystal dripping method are the same as each other with regard to the procedure up to here.

Next, a necessary amount of liquid crystal is dripped on the inside (display panel portion) of a first seal frame 2 on the array substrate. This dripping of liquid crystal is performed using a dispenser device dedicated to liquid crystal. In short, the amount of liquid crystal necessary for a display surface is calculated in advance and the calculated amount of liquid crystal is dripped on the inside, namely, the display surface of the first seal frame 2. And the spacer scattered on the CF substrate is fast stuck on the CF substrate by being raised in temperature in an electric furnace.

When the dripping of liquid crystal and the sticking of spacer have been finished, both the substrates are transferred into a vacuum chamber. This vacuum chamber is evacuated so as to be depressurized to about $10^{-2}$ Pa inside it. Both these substrates are stuck on each other with the first seal frames 2 and the second seal frame 3A between them in a vacuum atmosphere. The seals are hardened in a temporarily hardened state at this time.

Next, the vacuum chamber is released (broken in vacuum) and both the substrates stuck together are taken out from the chamber. Then, both the substrates stuck together are raised in temperature in an electric furnace to properly harden the seal frames 2 and 3A being in a temporarily hardened state.

Further, both the substrates being in a single sheet state are cut out into individual panels. The panels obtained by cutting are washed and then such a panel post-process as a polarizing-plate sticking process and the like is performed on the panels. The above-mentioned procedure is the production flow of a liquid crystal display device.

Next, concrete steps of production are described with reference to FIG. 3A to FIG. 3E.

Figure 3A:
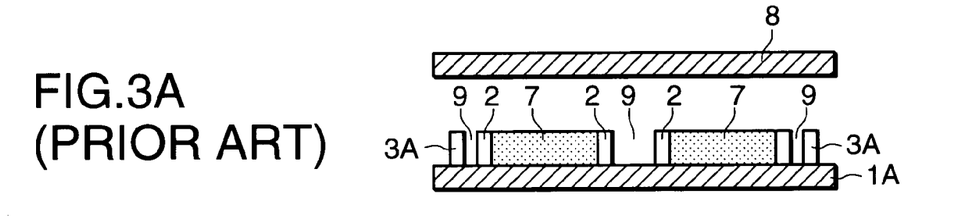
FIG. 3A to FIG. 3E are sectional views of liquid crystal display panels taken along line I—I of FIG. 1 showing the production steps in order of process in FIG. 2.

First, as shown in FIG. 3A, with regard to this liquid crystal display panel, first seal frames 2 and a second seal frame 3A are formed on an array substrate 1A. Liquid crystal 7 is dripped and filled in the inside of the first seal frames 2 before a CF substrate 8 is stuck on the array substrate 1A. Space 9 is formed in seal inner passage 5 and seal outer peripheral passage 6 (see FIG. 1 for both the passages).

Figure 3B:
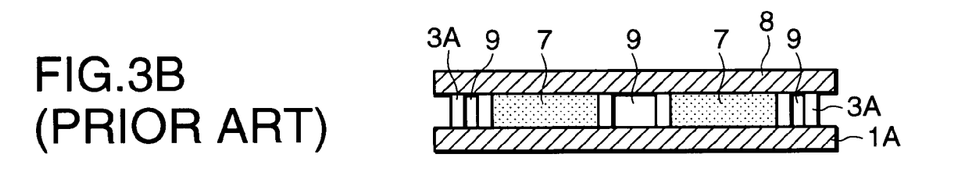

Next, as shown in FIG. 3B, the CF substrate 8 is placed over the array substrate 1A. As a result, a large space 9 is formed in the inner passage and a small space 9 is formed in the outer peripheral passage.

Figure 3C:
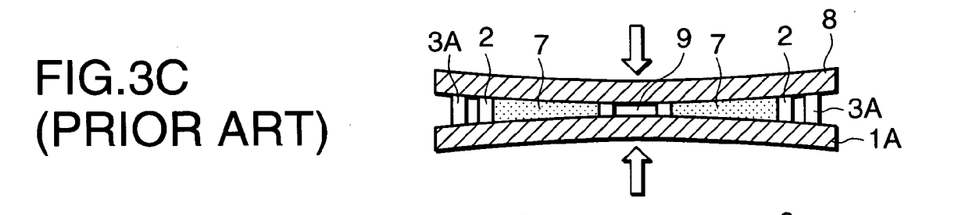

Further, as shown in FIG. 3C, both the substrates are stuck together in a vacuum chamber being evacuated. At this time, both the substrates are supported by the two sealing means of the first seal frames 2 and the second seal frame 3A at the seal outer peripheral passage side. And both the substrates are supported by single means of only the first seal frames 2 at the seal inner passage side. The space 9 formed at the seal inner passage side is liable to be more influenced by the vacuum pressure since it is wider. Due to this, both the substrates come to receive respectively pressures in the arrow directions from the outside.

Figure 3D:
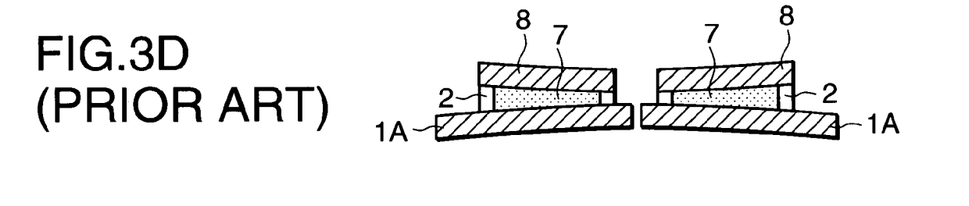

Next, as shown in FIG. 3D, when after properly hardening the seals both the substrates are taken out from the chamber and cut into individual panels, the panels being in a state where the space 9 at the seal inner passage side is collapsed result in being obtained (before washing).

Figure 3E:
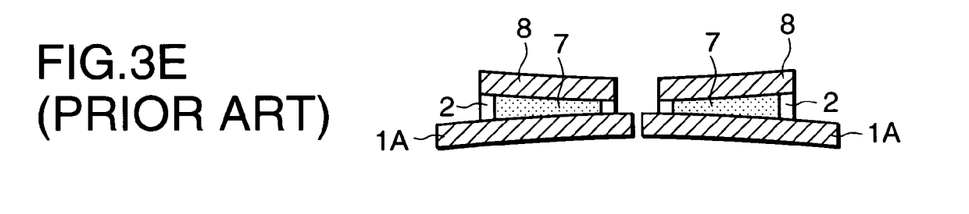

Further, as shown in FIG. 3E, the array substrate 1A and the CF substrate are not made parallel with each other even when the panels are washed, and the panels are sent to a subsequent process as being kept in a state where the inner passage side is lower in particular. So-called defective products occur (after washing).

In short, since nothing is sealed between patterns of the first seal and the second seal, a vacuum state occurs and the action of the first seal as a fulcrum results in producing a state of uneven gap around a panel.

SUMMARY OF THE INVENTION

An object of the present invention is to provide a liquid crystal display device solving the above-mentioned problem in liquid crystal display devices formed by a conventional multi-panel forming process and improving the uniformity in gap between an array substrate and a CF substrate, and a method for manufacturing the same.

A liquid crystal display device of the present invention comprises an array substrate, a CF substrate disposed opposite to the array substrate and a liquid crystal layer interposed between the array substrate and the CF substrate. The array substrate comprises a completely closed first seal frame and a completely closed second seal frame, and the second seal frame is formed so as to contain the first seal frame. The whole inside area of the second seal frame including the inside of the first seal frame is filled with liquid crystal. The array substrate and the CF substrate are stuck together through the first seal frame and the second seal frame.

The above-described liquid crystal display device of the present invention comprises one or plural first seal frames, and the liquid crystal layer is filled with liquid crystal by a liquid crystal dripping method.

A thermosetting low-melting point glass adhesive agent or a thermosetting epoxy-based adhesive agent can be used as a material for the first seal frame and the second seal frame of the above-mentioned liquid crystal display device of the present invention. And an oriented film for liquid crystal is formed on each of the surfaces of the array substrate and the CF substrate, said surfaces being opposite to each other.

In a method of manufacturing a liquid crystal display device of the present invention, a first seal frame to become a panel area and a second seal frame containing the first seal frame and being completely closed as a whole outside the first seal frame are formed on an array substrate covered with an oriented film. And liquid crystal is dripped on the whole inside of the second seal frame including the inside of the first seal frame. A CF substrate is stuck on the array substrate through the first seal frame and the second seal frame in a vacuum atmosphere. Next, the vacuum atmosphere is released and the first seal frame and the second seal frame are properly hardened and thereby a liquid crystal display panel is manufactured. In a liquid crystal display device manufacturing method of the present invention, an aggregate structure of plural liquid crystal display panels, said aggregate structure being partitioned by first seal frames, can be obtained by arranging plural first seal frames on an array substrate. Individual liquid crystal display panels can be obtained by cutting and separating this aggregate panel structure.

In the above-described liquid crystal display device manufacturing method of the present invention, after liquid crystal has been dripped on the whole inside of the second seal frame including the inside of the first seal frame, the array substrate and the CF substrate are stuck together and thereby a liquid crystal display panel is manufactured. Since the whole area inside the second seal frame including the inside of the first seal frame is filled with liquid crystal and there is no vacant space, it is possible to manufacture a liquid crystal display panel keeping the uniformity in gap between an array substrate and a CF substrate. The liquid crystal display device manufacturing method of the present invention can provide a great effect in manufacturing an aggregate liquid crystal display panel structure.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

A liquid crystal display device of the present invention is manufactured by a method of using a seal frame doubly closed and filling a space between a pair of transparent substrates with liquid crystal by means of a liquid crystal dripping method. One of the pair of transparent substrates is an array substrate in which thin film transistors (TFT's) are formed. The other substrate being opposite to this is a color filter substrate in which a color filter layer is formed. The liquid crystal display device of this invention is inside of the panel display portion and outside of the panel display portion to realize the uniformity of the gap between the array substrate and the CF substrate by evening it up as for the distortion that occurs on the panel side because of the atmospheric pressure when dripping and filling liquid crystal in the inside and outside of the panel display area.

The liquid crystal display device of the present invention is provided with an aggregate AM-LCD (Active Matrix-Liquid Crystal Display) structure having a plurality of active matrix liquid crystal displays in an array substrate. The aggregate AM-LCD structure uses a doubly closed seal frame structure composed of a plurality of first seal frames each partitioning an AM-LCD area and a second seal frame outside of these first seal frames on an array substrate and is formed by being filled with liquid crystal by a liquid crystal dripping method. The liquid crystal is filled in the whole inside area of the second seal frame including the insides of the first seal frames by a liquid crystal dripping method. The first seal frames and the second seal frame each are of a completely closed structure. In the present invention, it is possible to manufacture liquid crystal display devices by a multi-panel forming process, using a doubly closed seal frame structure and suppressing the unevenness in gap around a display area. Embodiments of the present invention are described with reference to FIG. 4 to FIG. 7 in the following.

(Embodiment 1)

Figure 4:
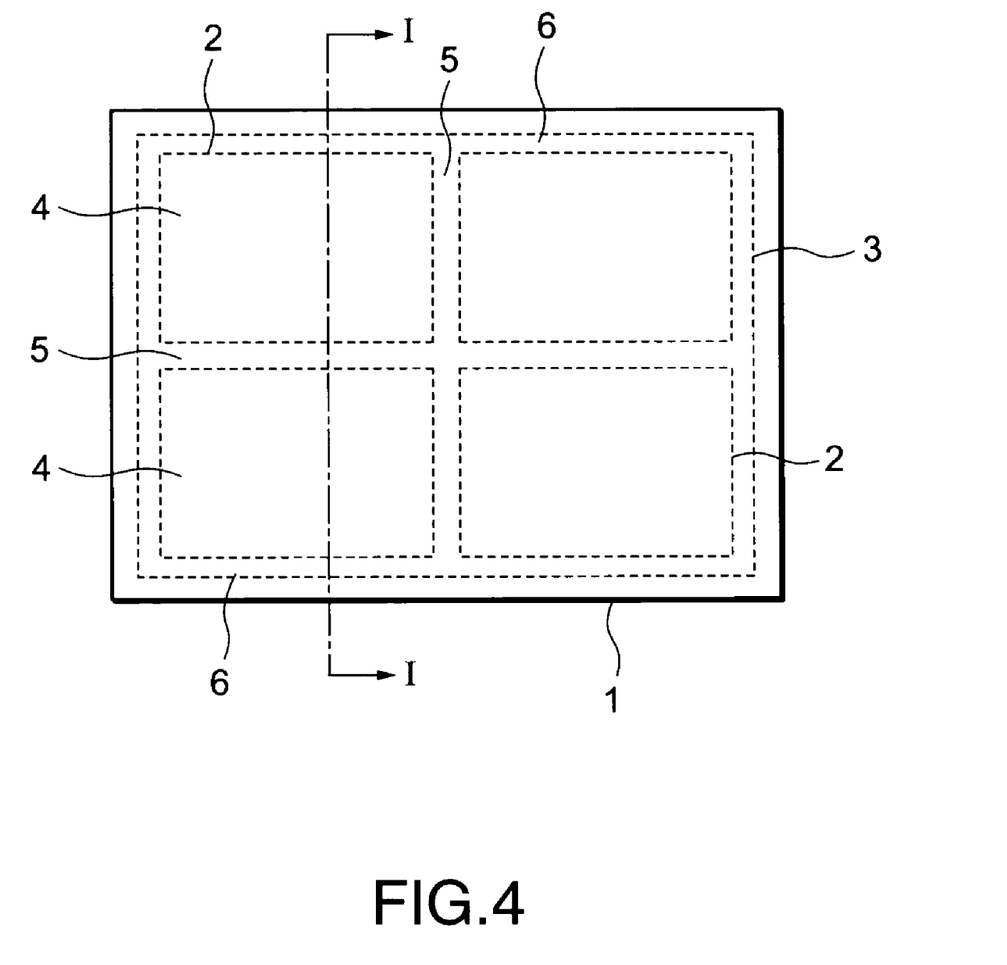
FIG. 4 is a plan view of an array substrate to be used in a liquid crystal display device of the present invention.

FIG. 4 is a plan view of an array substrate to be used in a liquid crystal display device of the present invention. As shown in FIG. 4, an array substrate 1 to be used in a liquid crystal display device of this embodiment comprises first seal frames 2 and a second seal frame 3 outside them. The inner area of first seal frame 2 has liquid crystal dripped on it to form a panel display portion. The second seal frame 3 is of a large single shape closing the whole of it without having a cutout part and containing the first seal frames 2 inside it. And the inner area of first seal frame 2 has liquid crystal dripped on it to form the display portion of a display device. On the other hand, the second seal frame 3 is outside the display portions but liquid crystal is dripped on this area. FIG. 1 is an example in which four first seal frames 2 exist inside a large single second seal frame 3. As a material for these seal frames, an ultraviolet-setting and thermosetting epoxy-based adhesive agent or the like can be used.

In such an array substrate, a seal inner passage 5 is formed between the first seal frames 2 and a seal outer peripheral passage 6 is formed between the first seal frames 2 and the second seal frame 3. And in a conventional example described above (see FIG. 1), the four corners of the second seal frame 3A have been cut out. In this embodiment, since liquid crystal is dripped also on the seal inner passage 5 and the outer peripheral passage 6, the whole structure is closed without having the four corners cut out, in order to prevent the liquid crystal from flowing out. Although an example having four first seal frames 2 each forming a panel area 4 has been shown as described above, the number of first seal frames may be two, three or more than four. And a double seal frame structure of the present invention can be also applied to the case that the number of first seal frames 2 is one.

Figure 5:
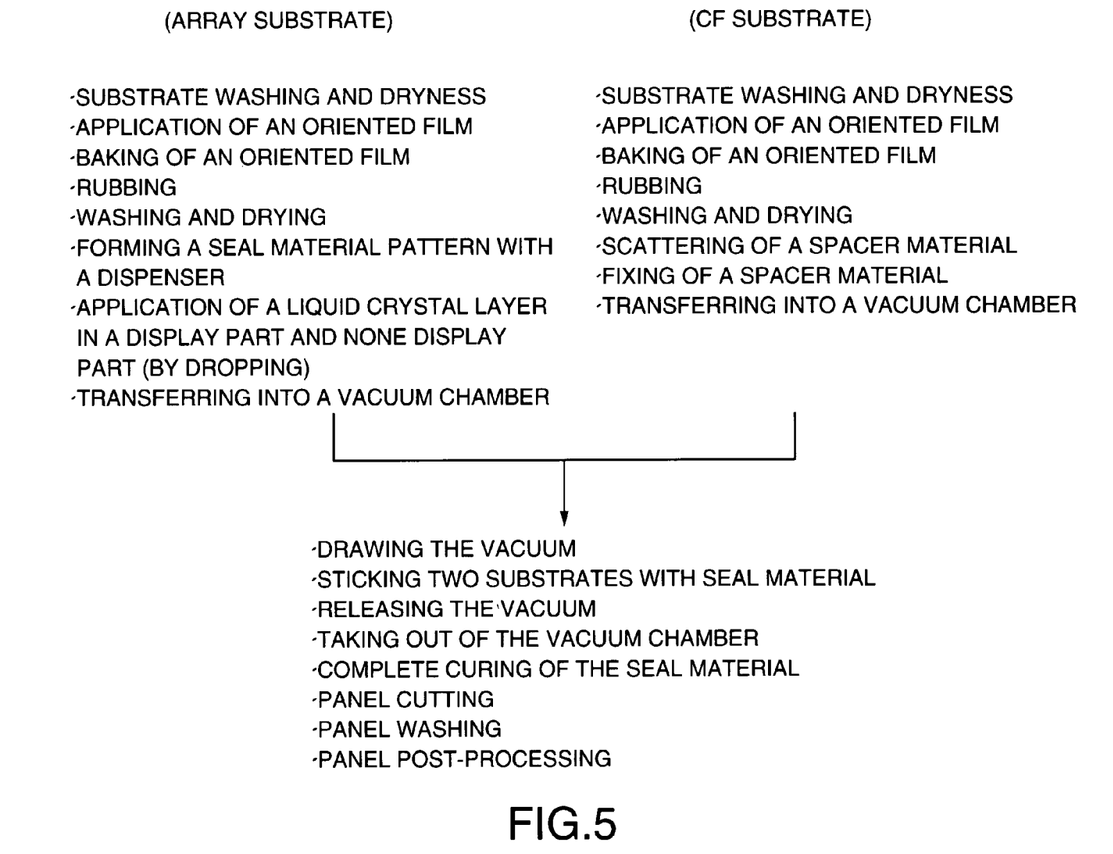
FIG. 5 is a flow chart for explaining the production steps of a liquid crystal display device of the present invention.

FIG. 5 is a flow chart for explaining the production steps of a liquid crystal display device of the present invention. As shown in FIG. 5, the upper left half part of the figure is a production flow of an array substrate 1 and the upper right half part is a production flow of a color filter (CF) substrate not illustrated in FIG. 3.

First, both of an array substrate and a CF substrate are washed and dried. Then, an oriented film (orientation material) is applied or printed onto the surface of each of both the substrates, and both the substrates are dried to evaporate a solvent contained in the orientation material. After this, rubbing is performed on both the substrates to give an orientation to the applied orientation material. Subsequently, both the substrates are washed and dried. As a material for the oriented film, an organic insulating film of polyimide or the like is used.

After this, a seal material is applied to the array substrate and a patterning process is performed on it. As the seal material, an ultraviolet-setting and thermosetting epoxy resin has been used. In this patterning process, first seal frames 2 each sealing the periphery of a panel display portion in the shape of a closed loop are first formed. Further, a second seal frame 3 formed to be completely closed as a whole is formed so as to contain the first seal frames 2 inside it. As a method of forming these seals, a drawing method using a seal dispenser device is used. On the other hand, a spacer material is scattered on the surface of the CF substrate. The second seal frame 3 with its whole closed structure makes it possible to make the inside of a panel more vacuum.

Next, a necessary amount of liquid crystal is dripped on the inside (panel display part) of each of the first seal frames 2 and the inside (outside the panel display parts) of the second seal frame 3 on the array substrate. The inside of the second seal frame 3 is the seal inner passage 4 and the seal outer peripheral passage 6. This dripping of liquid crystal is performed using a dispenser device dedicated to liquid crystal. In short, the amounts of liquid crystal necessary for display surfaces and a non-display surface are respectively calculated in advance and the calculated amounts of liquid crystal are dripped on the insides of the first seal frames 2 and the inside of the second seal frame 3, namely, on the display surfaces and the non-display surface. And the spacer scattered on the CF substrate is fast stuck on the CF substrate by being raised in temperature in an electric furnace.

When the dripping of liquid crystal and the sticking of spacer have been finished, both the substrates are transferred into a vacuum chamber. This vacuum chamber is evacuated to be depressurized to about $10^{-2}$ Pa inside it. Both these substrates are stuck on each other with the first seal frames 2 and the second seal frame 3 between them in a vacuum atmosphere.

Next, the vacuum chamber is released (broken in vacuum) and both the substrates stuck together are taken out from the chamber. The first seal frames 2 and the second seal frame 3 between both the stuck substrates are temporarily hardened by UV irradiation. The amount of UV irradiated is 1,000 to 2,000 mJ/cm$^2$, for example.

Next, both the substrates stuck together are raised in temperature in an electric furnace to properly harden the seal frames 2 and 3 being in a temporarily hardened state. The condition for hardening is at 100 to 120° C. for 30 to 100 minutes, for example.

Further, both the substrates being in a single sheet state are cut out into individual panels. The panels obtained by cutting are washed and then such a post-process as a polarizing plate sticking process or the like is performed on the panels. The above-mentioned procedure is the production flow of a liquid crystal display device.

Next, concrete steps of production are described with reference to FIG. 6A to FIG. 6E.

Figure 6A:
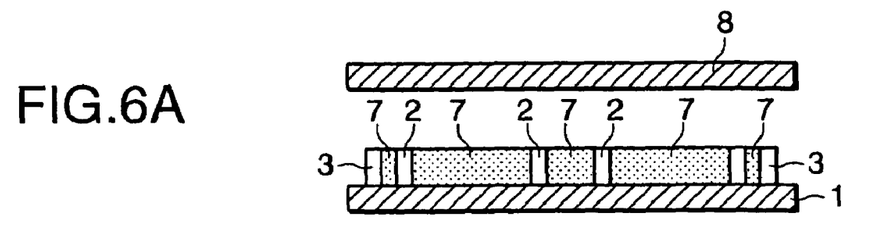
FIG. 6A to FIG. 6E are sectional views of liquid crystal display panels taken along line I—I of FIG. 4 showing the production steps in order of process in FIG. 5.

First, as shown in FIG. 6A, with regard to this liquid crystal display panel, first seal frames 2 and a second seal frame 3 are formed on an array substrate 1. Liquid crystal 7 is dripped and filled in the inside of the first seal frames 2 and in a space between the first seal frames 2 and the second seal frame 3, namely, in the space formed by the seal inner passage 5 and the outer peripheral passage 6 before a CF substrate 8 is stuck on the array substrate 1. The liquid crystal dropping to seal internal passage 5 and seal outer passage 6 can be performed at the same time when weight is given in the time shortening, and weight is given in the parallelism of both substrates, this liquid crystal dropping can be independently performed in seal internal passage 5 and seal outer passage 6.

Figure 6B:
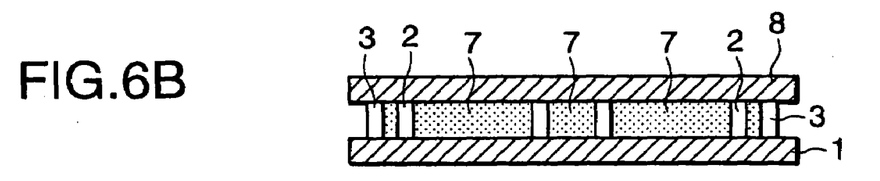

Next, as shown in FIG. 6B, the CF substrate 8 is placed over the array substrate 1 inside a vacuum chamber. After this, the vacuum chamber is evacuated and both the substrates are stuck together in vacuum. At this time, since the space between the seals is filled with liquid crystal and there is no vacant space, a problem that the seal inner passage part is collapsed is solved.

Figure 6C:
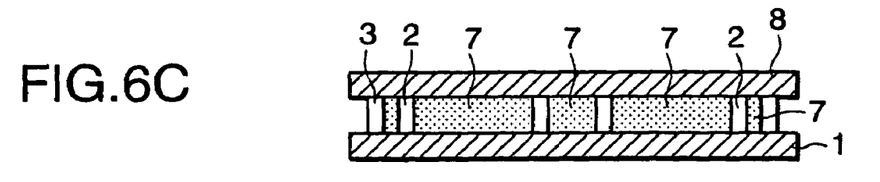

Further, as shown in FIG. 6C, both the substrates are taken out from the chamber and the seals are properly hardened in the atmosphere.

Figure 6D:
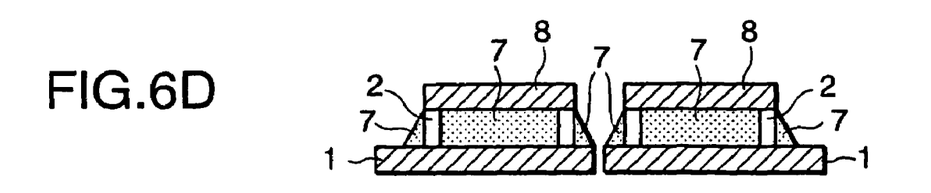

Next, as shown in FIG. 6D, when after properly hardening the seals both the substrates are cut into individual panels, the panels come to be cut in a state where liquid crystal remains in both of the seal inner passage 5 and the outer peripheral passage 6.

Figure 6E:
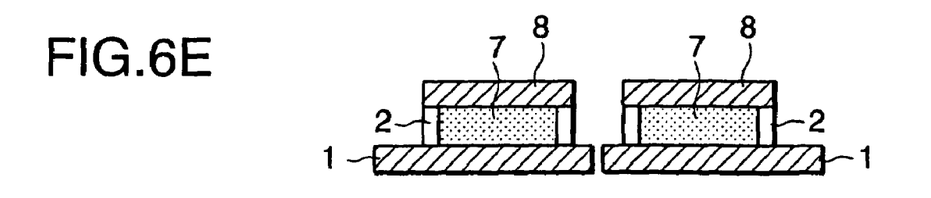

Further, as shown in FIG. 6E, when the panels are washed, the liquid crystal 7 remaining in the seal inner passage 5 and the outer peripheral passage 6 is flowed out and a liquid crystal display portion being uniform in gap between both the substrates can be obtained.

Figure 7:
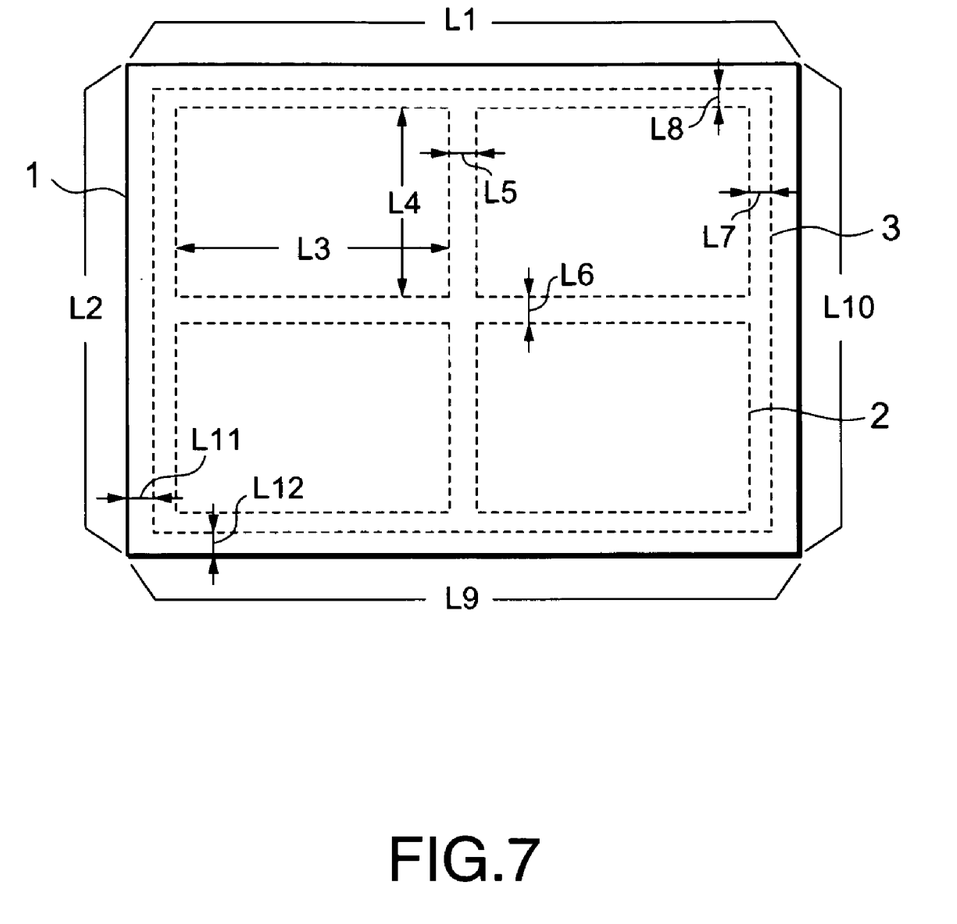
FIG. 7 is a plan view of an array substrate for explaining a concrete example of a liquid crystal display device of the present invention.

FIG. 7 is a plan view of an array substrate for explaining a concrete example of a liquid crystal display device according to the present invention. FIG. 7 is an example of a 4-panel forming product of L1=465 mm, L2=360 mm in substrate size (L1, L2) and L3=216.9 mm, L4=162.9 mm in display surface size (L3, L4). The production process of this liquid crystal panel is described according to its production procedure.

First, in the production flow of FIG. 5, since a liquid crystal injection method and a liquid crystal dripping method are the same as each other from a washing process to a rubbing and washing process of both substrates and from a transfer process into a vacuum chamber to a panel post-process, the description is omitted.

First, seal patterns are drawn on an array substrate 1. At this time a first seal frame 2 is L3=216.9 mm and L4=162.9 mm in size as described above, and four seal patterns of it are drawn. In this embodiment, a second seal frame (L9, L10) 3 is drawn so as to surround the first seal frame patterns. This second seal 3 is L9=451.8 mm and L10=339.5 mm in size. These dimensions are determined by using the center lines of the respective seal widths.

Next, liquid crystal 7 is dripped on the array substrate 1. A necessary amount of liquid crystal (about 159 mm$^3$×4 panels) is dripped inside the patterns of the first seal frames 2. And a CF substrate is raised in temperature in an electric furnace and the scattered spacer material is fast stuck on the CF substrate. Similarly, a necessary amount of liquid crystal (about 54 mm$^3$) is also dripped between the first seal frames 2 and the second seal frame 3. As a result, L5, L6 to form the seal inner passage 5 come to be L5=7.6 mm, L6=5.6 mm and L7, L8 to form the seal outer peripheral passage 6 come to be L7=5.2 mm, L8=4.1 mm. Further, distances L11 and L12 between the outer edges of the array substrate 1 and the second seal frame 3 are L11=6.6 mm and L12=10.2 mm. The amount of liquid crystal shown in the parentheses is a value on the assumption that the width of seal is 0.7 mm and the cell gap (distance between substrates 1, 8) is 0.0045 mm.

In this way, according to this embodiment, by sealing liquid such as a liquid crystal material and the like also between the first seal patterns and the second seal pattern, it is possible to reduce or suppress the unevenness in gap formed between the glass substrates stuck together.

(Embodiment 2)

And according to the present invention, in addition to the above-mentioned embodiment, for example, when a spot being uneven in gap occurs around a panel area due to a structural cause and the like of a liquid crystal display device, it is possible also to control the unevenness in peripheral gap by adjusting the amount of a liquid crystal material to be sealed between a first seal pattern and a second seal pattern. Concretely, it is possible also to adjust a gap by making the amount of liquid crystal to be dripped on the seal outer peripheral passage less than the amount of liquid crystal to be dripped on the seal inner passage.

The present invention was explained for the liquid crystal display having the filter on the substrate opposing to the array substrate. The present invention can be also applied to a liquid crystal display having an array substrate with a color filter.

The present invention can be applied to a liquid crystal display device to be used in a display device of active matrix type or a display portion of a mobile telephone and a method for manufacturing the same.

While the present invention has been described in conjunction with certain preferred embodiments, it is to be understood that the subject matter encompassed by way of the present invention is not limited to those specific embodiments. On the contrary, it is intended for the subject matter of the invention to include all alternative, modification and equivalents as can be included within the spirit and scope of the following claims.

What is claimed is:

1. A liquid crystal display device comprising:
   a first substrate, said first substrate being provided with a first seal frame completely closed and a second seal frame completely closed, said second seal frame containing said first seal frame thereinside;
   a second substrate arranged opposite to said array substrate; and
   a liquid crystal layer interposed between said first substrate and said second substrate,
   wherein the whole area inside said second seal frame including an area between said first seal frame and said second seal frame is filled with liquid crystal to form said liquid crystal layer, and said first substrate and said second substrate are joined-through said first seal frame and said second seal frame.

2. A liquid crystal display device according to claim 1, further comprising a plurality of said first seal frames.

3. A liquid crystal display device according to claim 1, wherein said liquid crystal of said liquid crystal layer is filled by a liquid crystal dripping method.

4. A liquid crystal display device according to claim 1, wherein a material for said first seal frame and said second seal frame comprises an ultraviolet-setting and thermosetting epoxy-based adhesive agent.

5. A liquid crystal display device according to claim 1, wherein an oriented film for said liquid crystal is formed on each of the surfaces of said first substrate and said second substrate, said surfaces being opposite to each other.

6. A method for manufacturing a liquid crystal display device, comprising:
   forming a first seal frame to form a panel area and forming a second seal frame spaced apart from and containing said first seal frame thereinside and having a completely closed shape outside said first seal frame on a first substrate covered with an oriented film;
   dripping liquid crystal on the whole inside of said second seal frame including the inside of said first seal frame and a space between said first seal frame and said second seal frame;

joining said first substrate and a second substrate through said first seal frame and said second seal frame in a vacuum atmosphere; and releasing said vacuum atmosphere and hardening said first seal frame and said second seal frame.

7. A method for manufacturing a liquid crystal display device according to claim 6, wherein said first seal frame is at least one in number.

8. A method for manufacturing a liquid crystal display device according to claim 6, wherein a material for said first seal frame and said second seal frame comprises an ultraviolet-setting and thermosetting epoxy-based adhesive agent.

9. A method for manufacturing a liquid crystal display device according to claim 6, wherein a spacer material is scattered and stuck on said second substrate.

10. A method for manufacturing a liquid crystal display device according to claim 6, wherein the number of said first seal frames is plural and said method further comprises, after properly hardening said first seal frame and said second seal frame:

cutting out both said first and second substrates joined together into individual panel areas; and washing the liquid crystal remaining around said panel areas obtained by cutting.

11. A method for manufacturing a liquid crystal display device, comprising:

forming an oriented film on each of the surfaces of a first substrate and a second substrate;

rubbing the respective surfaces of said oriented films of both said substrates;

forming plural first seal frames and a second seal frame containing said first seal frames on said first substrate;

dripping and filling liquid crystal in the whole inside of said second seal frame including the insides of said first seal frames;

scattering and sticking a spacer material on said second substrate;

forming an aggregate liquid crystal display panel structure composed of plural panels partitioned by said first seal frames by joining said first substrate and said second substrate through said first seal frames and said second seal frame in a vacuum atmosphere;

hardening said first seal frames and said second seal frame in an atmospheric pressure;

cutting and separating said aggregate liquid crystal display panel structure into individual liquid crystal display panels; and washing out said liquid crystal remaining around said separated liquid crystal display panels, wherein said first seal frames and said second seal frame each are of a completely closed shape.

12. A method for manufacturing a liquid crystal display device, comprising:

forming a first seal frame to form a panel area and a second seal frame containing said first seal frame thereinside and having a completely closed shape outside said first seal frame on a first substrate covered with an oriented film;

dripping liquid crystal on the whole inside of said second seal frame including the inside of said first seal frame;

joining said first substrate and a second substrate through said first seal frame and said second seal frame in a vacuum atmosphere;

releasing said vacuum atmosphere and hardening said first seal frame and said second seal frame;

cutting out both said substrates joined together into individual panel areas; and washing the liquid crystal remaining around said panel areas obtained by cuffing, wherein the number of said first seal frames is plural.

13. A liquid crystal display device according to claim 1, wherein the first substrate comprises an array substrate.

14. A liquid crystal display device according to claim 1, wherein the second substrate comprises a color filter substrate.

15. A liquid crystal display device according to claim 1, wherein a gap is formed between the first seal frame and the second seal frame.

16. A liquid crystal display device according to claim 1, wherein a spacing between the first substrate and the second substrate is substantially uniform.

* * * * *